United States Patent [19]
Kodaira

[11] Patent Number: 5,079,576
[45] Date of Patent: Jan. 7, 1992

[54] FILTER APPARATUS FOR CAMERA

[75] Inventor: Takanori Kodaira, Tokyo, Japan

[73] Assignee: Canon Kabushiki Kaisha, Tokyo, Japan

[21] Appl. No.: 14,020

[22] Filed: Feb. 12, 1987

[30] Foreign Application Priority Data

| Feb. 17, 1986 | [JP] | Japan | 61-032601 |
| Feb. 19, 1986 | [JP] | Japan | 61-022764[U] |
| Feb. 24, 1986 | [JP] | Japan | 61-038500 |
| Feb. 24, 1986 | [JP] | Japan | 61-038501 |

[51] Int. Cl.$^5$ ............................................. G03B 17/00
[52] U.S. Cl. ................................. 354/212; 354/202; 354/288; 359/889
[58] Field of Search ............ 354/100, 202, 295, 289.1, 354/212, 288; 352/45, 66; 350/315

[56] References Cited

U.S. PATENT DOCUMENTS

| 3,314,349 | 4/1967 | Koeber | 352/45 |
| 3,395,630 | 8/1968 | Haufler et al. | 354/202 |
| 3,427,943 | 2/1969 | Leibundgut | 354/202 |
| 3,602,583 | 8/1971 | Winkler | 350/315 |
| 3,661,458 | 5/1972 | Noemer et al. | 350/315 |
| 3,868,714 | 2/1975 | Muryoi | 350/315 |
| 4,571,043 | 2/1986 | Kobayashi et al. | 354/202 |
| 4,586,802 | 5/1986 | Nagano et al. | 354/295 |
| 4,597,643 | 7/1986 | Podvin et al. | 350/315 |
| 4,681,418 | 7/1987 | Kodaira | 354/289.1 |

FOREIGN PATENT DOCUMENTS

| 658643 | 3/1938 | Fed. Rep. of Germany | 354/202 |
| 1249075 | 8/1967 | Fed. Rep. of Germany | 354/202 |
| 1125731 | 8/1968 | United Kingdom | 352/66 |

Primary Examiner—A. A. Mathews
Attorney, Agent, or Firm—Fitzpatrick, Cella, Harper & Scinto

[57] ABSTRACT

This invention discloses an improvement of a filter apparatus for cameras and particularly discloses various arrangements for improving the filter apparatus for cameras in which, for example, an operating means for placing a filter in and taking it out of the optical path is provided so that the operating means automatically removes the filter from the optical path by stopping the operations of filter photography at the completion thereof. Thus, a photograph can be prevented from mistakenly being taken with the filter still in place in the optical path, and protective means for preventing damage of the filter surface is provided on the filter.

50 Claims, 6 Drawing Sheets

FILTER APPARATUS FOR CAMERA

BACKGROUND OF THE INVENTION

1. Field of the Invention

This invention relates to an improvement of a filter apparatus for cameras used in filter photography.

2. Description of the Prior Art

A camera containing a filter used in filter photography has been previously proposed (for example, U.S. patent application Ser. No. 765,330 filed by the applicants of this invention, now U.S. Pat. No. 4,681,418.

However, problems remain to be solved in such a conventional camera filter apparatus. For example, mistakes may be made resulting in a filter being left in place in the optical path when an ordinary photograph is to be taken, and the surface of the filter may be damaged, resulting in deterioration in the optical performance.

SUMMARY OF THE INVENTION

It is an object of this invention to solve the disadvantages of a conventional filter apparatus for cameras.

To achieve this object, this invention provides a configuration in which a filter is automatically removed from the optical path after the user has taken a photograph employing the filter without any need for an operating means by which the filter is placed in and taken out of the optical path. There is no possibly of a photograph mistakenly being taken with the filter still in place in the optical path. Furthermore, the filter is provided with a protective means so that the filter surface can be protected from damage.

It is another object of this invention to provide a holding means which enables the filter, when required, to be held in the optical path in the case, for example, of self timer photography even when the filter has been automatically removed from the optical path, this holding means serving to substitute in this regard for the above-described operating means.

Other objects of this invention will become clear from the description of the embodiments given below.

DETAILED DESCRIPTION OF THE PREFERRED EMBODIMENTS

An embodiment of this invention will be described with reference to the drawings.

Figure 1:
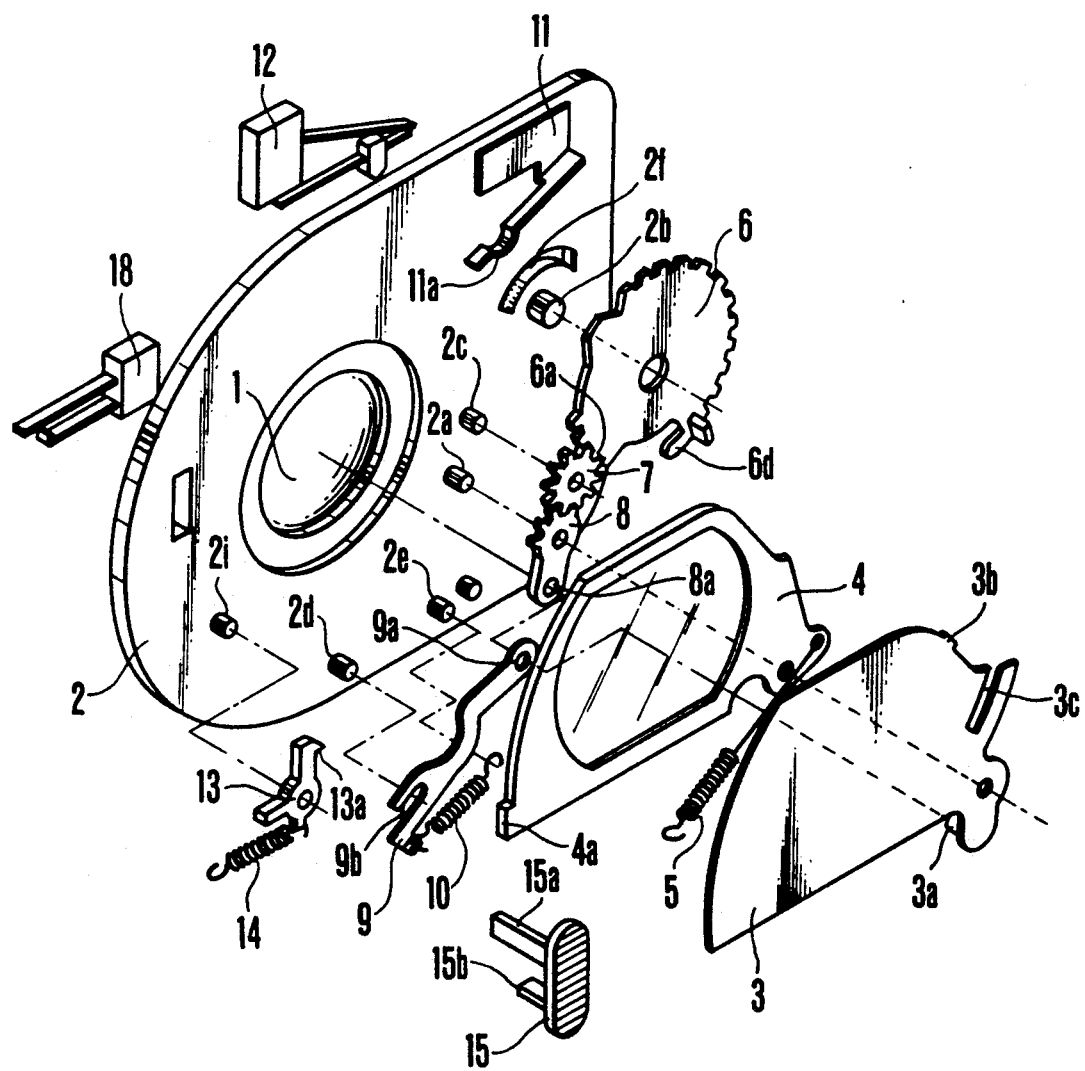
FIG. 1 is an exploded perspective view showing a filter operating mechanism in an embodiment of a filter-containing camera to which this invention relates.

FIG. 1 is an exploded perspective view showing an embodiment of a barrier and a filter operating mechanism in a filter-containing camera in accordance with this invention and FIGS. 2 to 5 are front views showing the operational states thereof.

In FIG. 1, reference number 1 denotes a photographic lens and reference number 2 denotes a base plate for holding the lens. Reference number 3 denotes a barrier which acts as a lens protecting cover and reference number 4 denotes a filter, both of which are placed in the optical path of the photographic lens except at the time of taking a photograph. The barrier 3 is rotatable around a shaft 2a provided on the base plate 2 and the filter 4 also is rotatable coaxially with the barrier 3 and is provided with a spring 5 which acts to remove the filter 4 from the optical path of the photographic lens 1, the filter 4 being constantly urged by the spring 5 in the clockwise direction.

Reference number 6 denotes an operational handle which serves as an operating means for opening and closing the barrier 3 and placing the filter 4 into and taken it out of the optical path of the photographic lens 1, this handle being rotatably mounted on a shaft 2b provided on the base plate 2. A partial gear 6a is formed on the operational handle 6. A gear 7 engagable with the partial gear 6a is rotatably mounted on a shaft 2c provided on the base plate 2 and a gear 8 which engages with the gear 7 is rotatably mounted coaxially with the barrier 3.

The gear 8 is provided with a hole 8a in which a shaft 3a provided on the barrier 3 engages so that the barrier 3 and the gear 8 are rotated together. A lever 9 engages with the shaft 3a of the barrier 3 in a hole 9a provided at one end thereof and slidably engages with a shaft 2d provided on the base plate 2 in a U-shaped groove 9b at the other end thereof. A spring 10 is provided in an expanded condition between the other end of the lever 9 and a shaft 2e provided on the base plate 2, whereby the lever is constantly urged to the right as viewed in the drawing so as to push the barrier 3 in the direction in which it moves to close.

A bent portion 3b is formed at the peripheral edge of the barrier and the peripheral edge of the filter 4 is brought into contact with this bent portion 3b.

Reference number 11 denotes a click spring which is fixed to the base plate 2 and a protruding portion 11a at the end thereof is bought into contact with the periphery of the operational handle 6. This functions to stop the operational handle 6 at an operating position when it is required to be operated, as described below. Reference number 12 denotes a main switch for turning on or off the control circuit of a camera, this switch being fixed to the back side of the base plate 2. Cams 6b, 6c (described below) are formed on the back side of the operational handle 6 and project from the back side of the base plate 2 through a slot 2f provided on the base plate 2, the contact point of the main switch 12 being opened or closed by these cams 6b, 6c (this operation is described hereinafter).

In the barrier and the filter operating mechanism, the operational handle 6 is operated in two steps comprising a first step in which, in the operational position thereof, the barrier 3 is opened and the filter 4 is removed from the optical path of the photographic lens 1 and a second step in which, in the operational position thereof, the filter 4 is inserted into the optical path of the photographic lens 1 while the barrier 3 is kept in the opened position. The operational handle 6 is held in the operational position of the second step only during the time when the first step is succeeded by activation of the second step, and the operational position of the first step is recovered when this activation is removed. A projection 6d is integrally formed in the operational handle 6 so that, when the operational handle 6 is in the operational position of the second step, the filter 4 is inserted into the optical path of the photographic lens 1 while the barrier 3 is kept in the opened position.

The operations of the above-mentioned operating mechanisms will now be described with reference to FIGS. 2 to 4.

Figure 2:
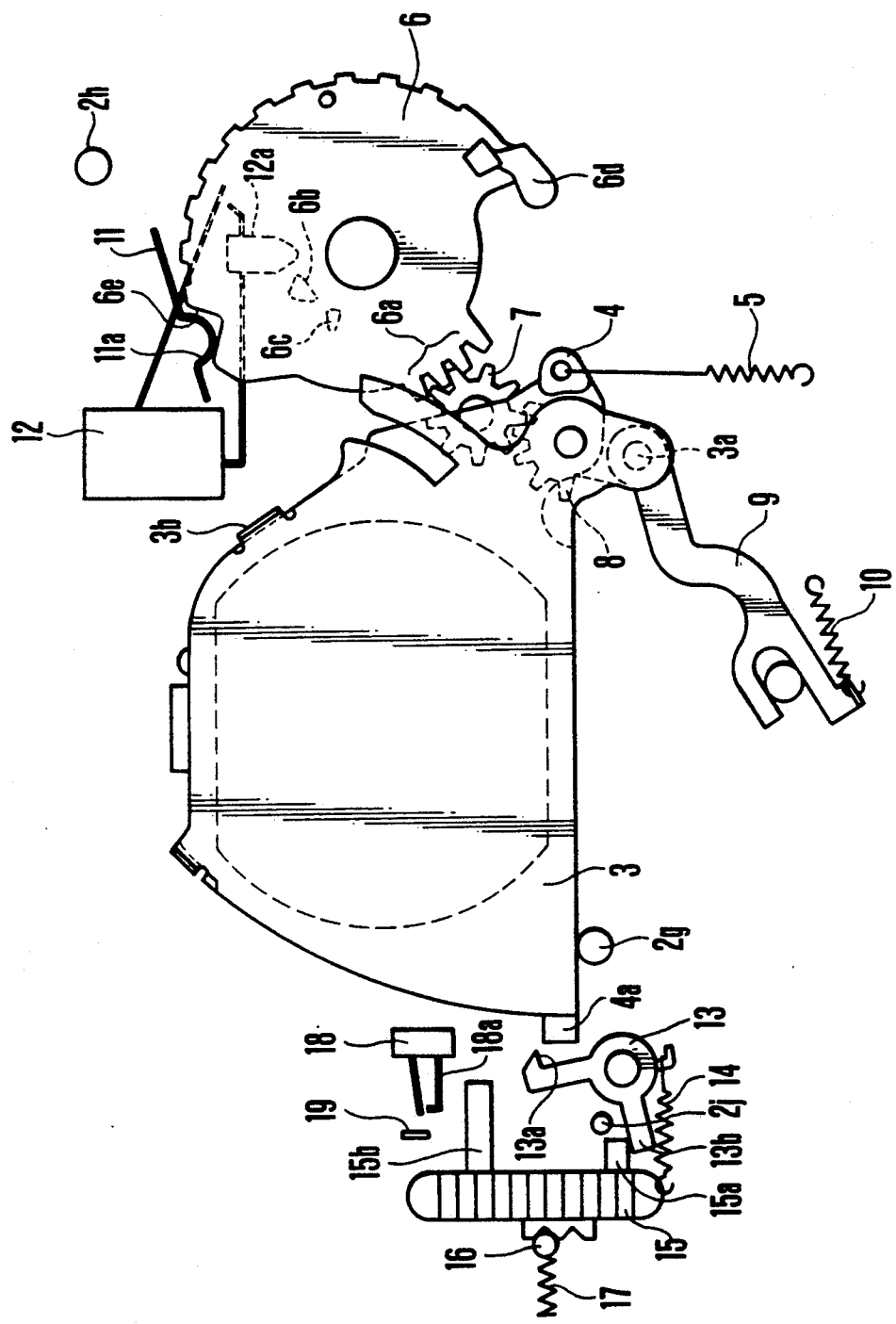
FIGS. 2 and 5 are front views showing the operations of the mechanism shown in FIG. 1.

FIG. 2 is a drawing showing one state of the closed barrier 3. The protruding portion 11a at the end of the click spring 11 has fallen into a V-shaped groove 6e of the operational handle 6 so as to urge the operational handle 6 in the counterclockwise direction. Since the gear portion 6a of the operational handle 6 engages with the gear 7 which engages with the gear 8, the barrier 3 which rotates integrally with the gear 8 is urged in the counterclockwise direction, but this rotation is prevented because of the contact with a stopper 2g provided on the base plate 2. Since the lever 9 is urged to the right by the spring 10, a counterclockwise force is applied to the gear 8 so that the barrier 3 which rotates integrally with the gear 8 is urged in the counterclockwise direction, but this rotation is more strongly urged in the counterclockwise direction through the shaft 3a of the barrier 3. The filter 4 is urged in the clockwise direction by the spring 5 but this rotation is prevented because its periphery is brought into contact with the bent portion 3b of the barrier 3 and the spring 5 is tensioned weakly. In this state, the main switch 12 of the control circuit of a camera is turned off and thus it is impossible to take a photograph even if the release button is pressed. At the same time, the barrier 3 and the filter 4 overlap each other and cover the front side of the photographic lens 1, thereby serving as a very strong guard in relation to static pressure from the front.

Figure 3:
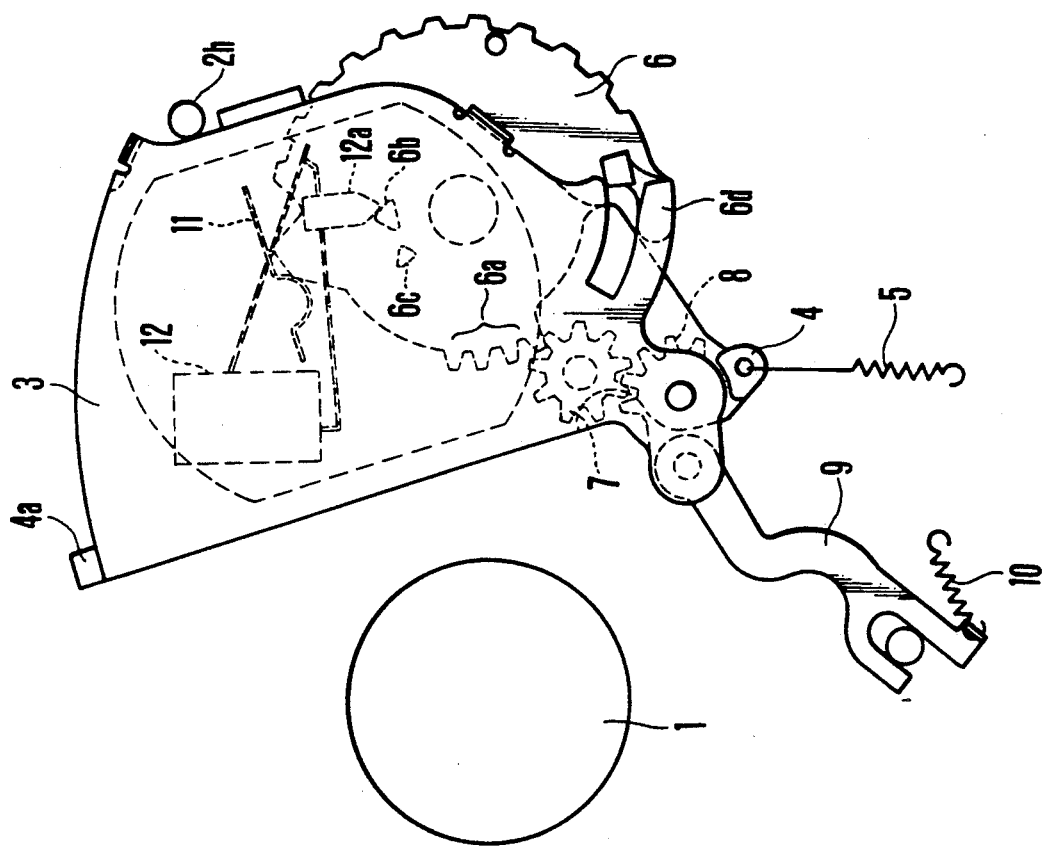
Figure 3:
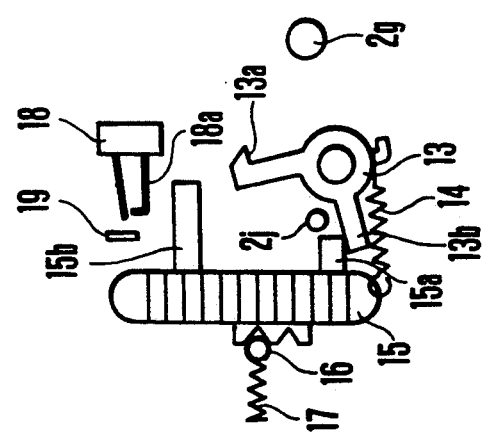

When the operational handle 6 is rotated in the clockwise direction from this state to the operational position of the first step shown in FIG. 3, the gear 8 is also rotated clockwise against the force of the spring 10 through the gear 7 and the barrier 3 is thus itself rotated clockwise. When the barrier 3 has rotated through a certain angle, a clockwise force is applied to the gear 8 by the spring 10 and the barrier 3 is urged in the clockwise direction by the spring 10 and the lever 9 and rotated until it is brought into contact with a stopper 2h provided on the base plate 2. Since the filter 4 is urged in the clockwise direction by the spring 5, it is itself rotated clockwise, following the barrier 3. When the barrier 3 has been rotated until the point where it is brought into contact with the stopper 2h provided on the base plate 2, the engagement between the partial gear 6a of the operational handle 6 and the gear 7 is released, but the operational handle 6 is kept in the operational position of the first step shown in FIG. 3 because it is urged in the clockwise direction by the click spring 11 and the projection 6d thereof is brought into contact with the periphery of the filter 4.

As described above, in the operational position of the first step shown in FIG. 3, the barrier 3 is held in the open position and the filter 4 is held aside from the optical path of the photographic lens 1. At the same time, the cam 6b provided on the reverse side of the operational handle 6 pushes the top end 12a of the main switch 12 upwardly so that the movable contact point of the former is brought into contact with the fixed contact point of the latter, which is thus turned on, allowing a photograph to then be taken. In this case, since both the barrier 3 and the filter 4 have been removed from the optical path of the photographic lens 1, an ordinary photograph is taken.

Figure 4:
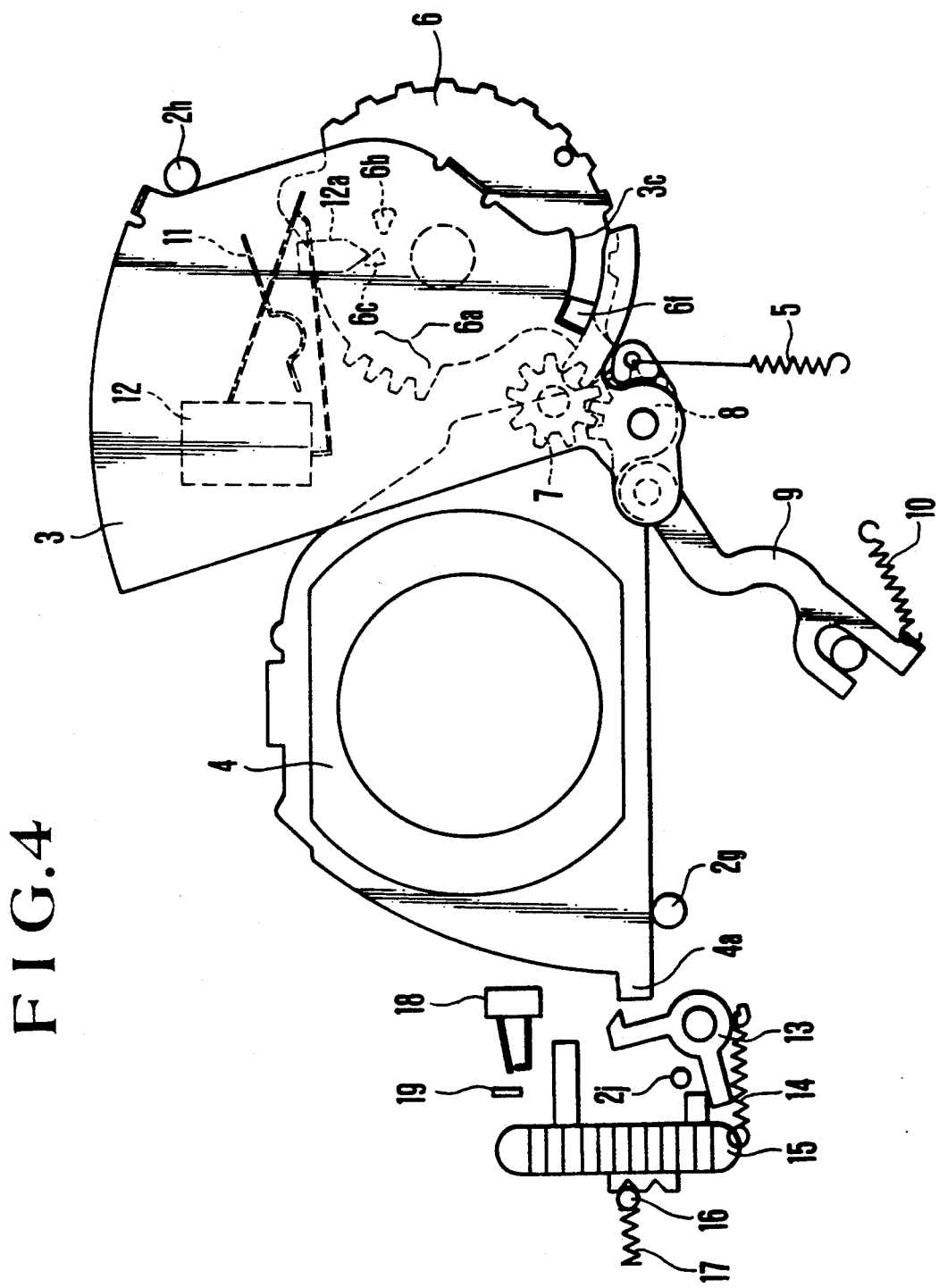
Figure 5:
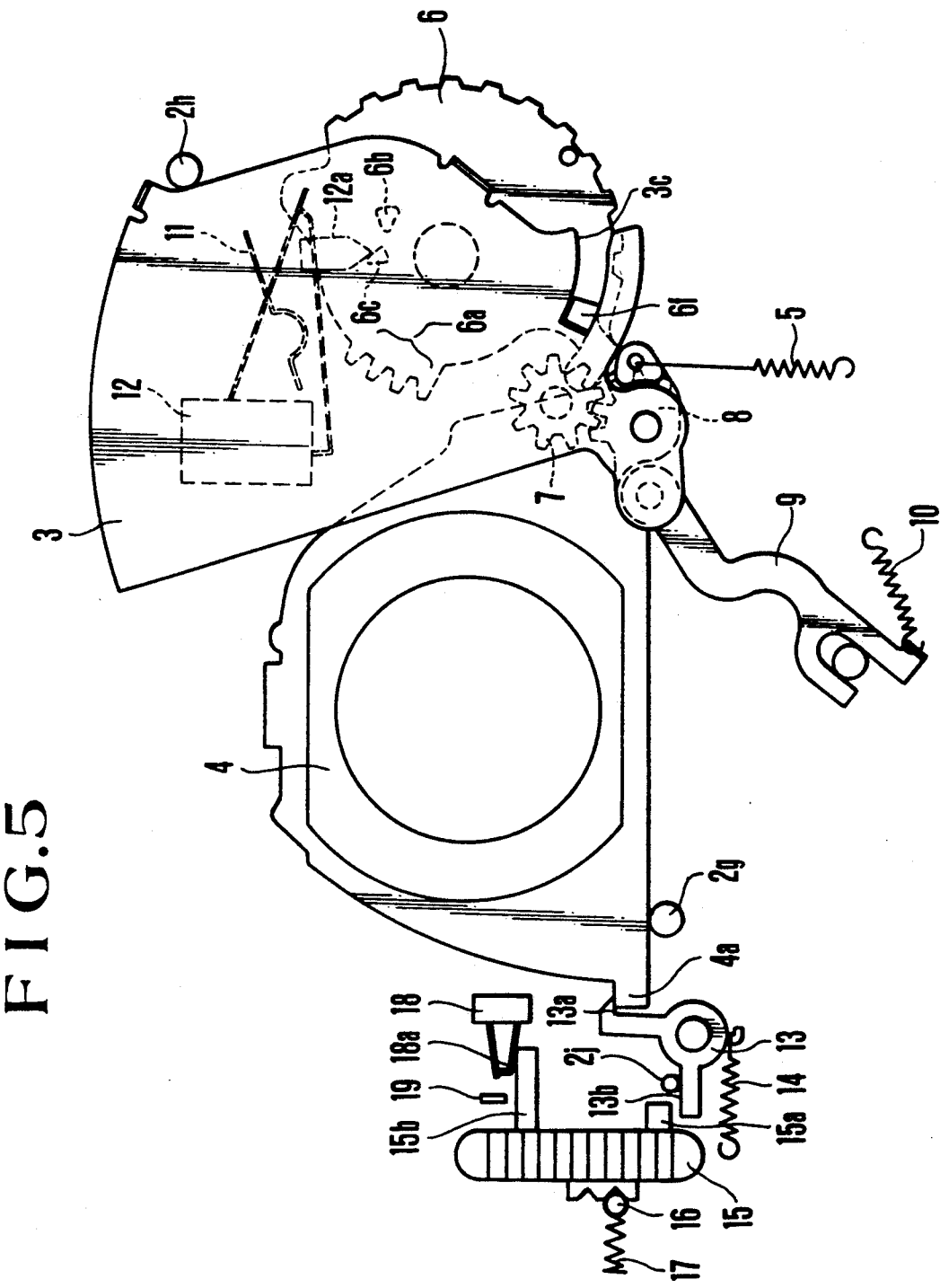

Then, when the operational handle 6 is further rotated in the clockwise direction from the operational position of the first step to the operational position of the second step, as shown in FIG. 4, the projection 6d pushes the periphery of the filter 4 so that filter 4 is rotated in the counterclockwise direction against the spring 5. Since the engagement between the partial gear 6a of the operational handle 6 and the gear 7 is released, the barrier 3 is held in an opened state. In addition, since the projection 6f of the operational handle 6 has fallen into the groove 3c formed on the barrier 3, if an impact force acts on the barrier 3 in the state of the operational position of the second step shown in FIG. 4, the barrier 3 is safely locked in the opened state. When the operational handle 6 starts to be rotated in the clockwise direction from the operational position of the first step shown in FIG. 3, the top end 12a of the switch 12 falls into the trough between the cams 6a and 6c whereby the switch 12 is again turned off and the release lock is engaged. When the operational handle 6 is rotated further and the filter 4 covers the photographic lens 1 and is brought into contact with the stopper 2g provided on the base plate 2, the top end 12a of the switch 12 is again pushed upwardly by the cam 6c so that the switch assumes an ON state and it becomes possible to take a photograph. In the operational position of the second step shown in FIG. 4, the filter 4 completely covers the photographic lens 1 and a specific type of photography using a filter becomes possible.

In the operational position of the second step shown in FIG. 4, when a user's finger is taken away from the operational handle 6, the filter 4 is urged by the spring 5 in the clockwise direction and thus rotates in the same direction and returns to the operational position of the first step shown in FIG. 3 while rotating the operational handle 6 in the counterclockwise direction. Thus, a photograph is taken using a filter while the operational handle 6 is being pressed by the user's finger and when the finger is taken away, the state for ordinary photography is recovered. In this way, there can be no possibility of a photograph mistakenly being taken with the filter still in place in the optical path. In addition, the release lock is engaged in the state where the filter completely covers the photographic lens 1 (or in the course of removal), thus preventing photographs from being mistakenly taken.

After a photograph has been taken and when the operational handle 6 is rotated in the counterclockwise direction from the operational position of the first step shown in FIG. 3, the partial gear 6a is again engaged with the gear 7 and the gear 8 is rotated in the counterclockwise direction so that the barrier 3 and the filter 4 are themselves rotated in the counterclockwise direction and the barrier 3 is returned to the closed state shown in FIG. 2.

In the above-described arrangement, when a hand is taken away from the operational handle 6, the filter 4 is automatically removed from the optical path of the photographic lens 1 by the action of the spring 5. Thus, the filter is made unusable in this state when it is necessary to take a photograph without the user's hand manipulating the operational handle 6, for example, when a photograph is to be taken by the camera set in a self-timer photographic mode.

For this reason, this invention provides a locking device as a holding means for holding the filter 4 in the optical path of the photographic lens 1 when required, for example, when the camera is put in a self-timer photographic mode. In FIGS. 1 and 2, reference number 13 denotes a stop lever in this locking device, this lever being rotatable around a shaft 2i provided on the base plate 2 and urged by a spring 14 in the clockwise direction. This stop ever 13 has a hook portion 13a which is engagable with a projection 4a formed on the filter 4. Reference number 15 denotes a self-timer photographic mode handle which is longitudinally slidably provided on the camera body and adapted to be displaced between an ordinary photographic position and a self-timer photographic mode position by a click stop device comprising a ball 16 and a spring 17 and stopped at either of such positions. Projections 15a and 15b are integrally formed on the self-timer photographic mode handle 15, the projection 15a being so disposed that it can be brought into contact with an arm 13b of the stop lever 13 and the projection 15b being so disposed that it can be brought into contact with a movable contact piece 18a of a switch 18. This switch 18 is connected to the control circuit (not shown in the drawing) of the camera which is adapted to be put in the self-timer photographic mode when this switch 18 is closed. Reference number 19 denotes a lever which moves in the longitudinal direction while interlocking a film-winding mechanism (not shown in the drawing). The lever is adapted to be downwardly displaced and to push the self-timer photographic move handle 15 downwardly when the film in the camera is wound, the handle thereby being returned to the ordinary photographic mode.

The operations of the above-described camera will now be described with reference to FIGS. 2 to 5.

In the ordinary photographic mode, but not the self-timer photographic mode, since the self-timer photographic mode handle 15 is placed in position for the ordinary photography (refer to FIGS. 2 to 4), the projection 15a is brought into contact with the arm 13b of the stop lever 13 so as to rotate the stop lever 13 in the counterclockwise direction against the force of the spring 14. Thus, the hook portion 13a of the stop lever 13 is removed from the range of the rotating projection 4a of the filter 4. At the same time, since the projection 15b of the self-timer photographic mode handle 15 is separated from the movable contact piece 18a of the switch 18, the switch 18 is in an OFF state and the camera control circuit is in the ordinary photographic mode.

In this condition, the stop lever 13 does not function and the operations of the camera are the same as in the above description.

The operations occurring in the self-timer photographic mode will now be described. When a photographer pushes the self-timer photographic mode handle 15 upwardly from the state where the barrier is open as shown in FIG. 3, the projection 15b pushes the contact piece 18a of the switch 18 upwardly and turns it on so that the camera control circuit is held in the position of the self-timer photographic mode. At this time, the projection 15a of the self-timer photographic mode handle 15 is upwardly displaced and the stop lever thus rotated by the spring force of the spring 14 in the clockwise direction and brought into contact with a stopper 2j provided on the base plate in the position shown in FIG. 5. In this state, when the operational handle 6 is rotated from the first operational position shown in FIG. 3 (in which the barrier is open and the filter is removed) to the position for filter photography (FIG. 5), the filter 4 is rotated in the counterclockwise direction and the projection 4a rotatively pushes the stop lever 13 so that the projection 4a is stopped by the hook portion 13a of the stop lever 13 in the state where the filter 4 completely covers the photographic lens 1. Therefore, if a photographer takes his hand away from the operational handle 6, the filter is held in the optical path and filter photography becomes possible in the self-timer photographic mode even though the user can no longer manipulate the camera. When a photograph has been taken in the self-timer photographic mode, the film is wound and the lever 19 pushes the self-timer photographic mode handle 15 downwardly, the switch 18 thereby being turned off and again returned to the ordinary photographic mode. In addition, the projection 15a allows the stop lever 13 to rotate in the counterclockwise direction so that the the filter 4 is released and is rotated by the spring 5 in the clockwise direction and returned to the position in which it is away from the optical path (FIG. 3).

In the above explanation, a device for locking the filter which employs a stop level for stopping the filter has been described, but other devices may optionally be used to act as this locking device. For example, an iron piece may be fixed to the filter so that it is possible to lock the filter by means of an electromagnet which is electrically charged only during the time of the self-timer photographic mode.

Furthermore, the case in which the filter is locked as described above involves not only the case of the self-timer photographic mode but also the case of interval photography, and a filter can be locked in the manner explained as occasion demands.

Figure 6:
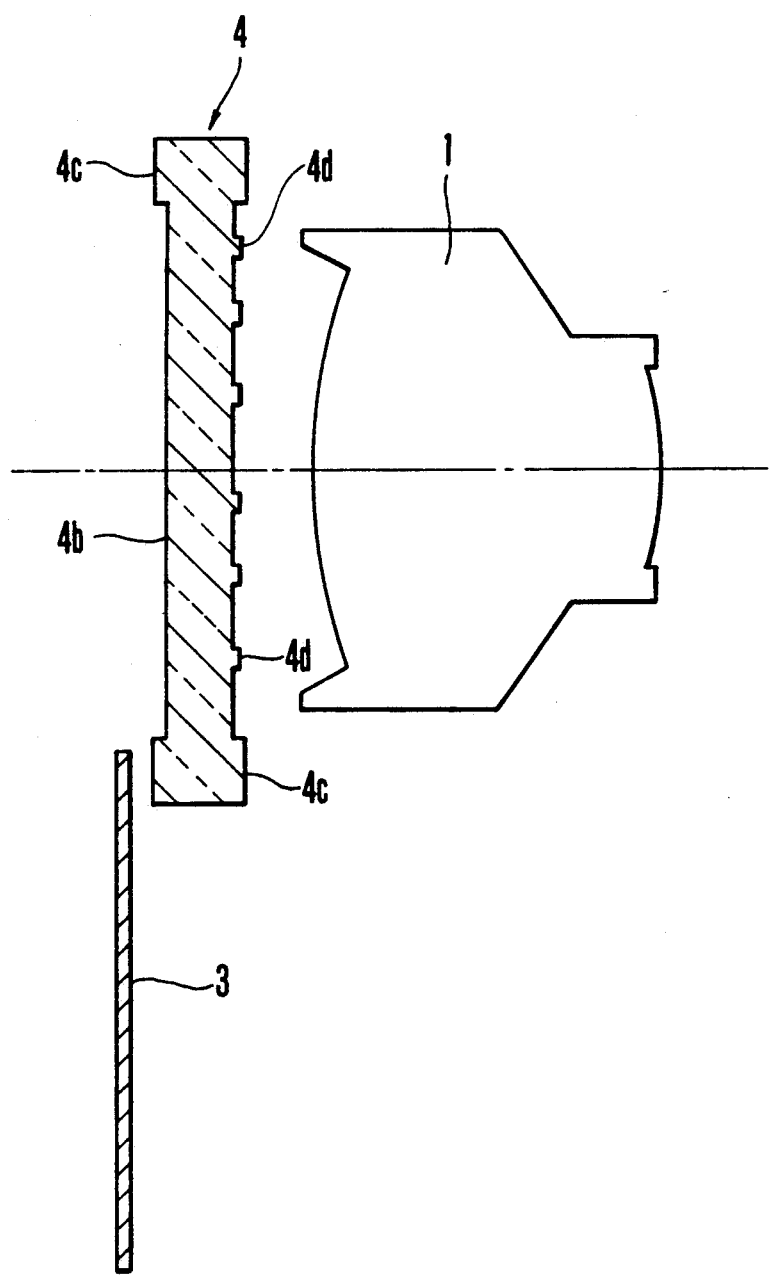
FIG. 6 is a side view of the configuration of a filter to which this invention relates.

FIG. 6 shows an arrangement of the filter to which this invention relates.

In a camera with a built-in filter of the above-described type, the filter 4 is rubbed on the base plate 2 and the barrier 3 when the barrier 3 and the filter 4 are moved. In the embodiment shown in the drawing, the filter 4 is made of a transparent acrylate resin and is of a phase type in which random dots 4d that produce a filter effect are formed on the back side thereof, as shown in FIG. 6.

In this invention, a protecting case 4c having a thickness greater than that of a filter body 4b (including the dots 4d) is integrally formed on the periphery of the body 4b (i.e. outside the optical path). Although the filter 4 slides on the base plate 2 and the barrier 3 slides on the filter 4, the above-described arrangement prevents any damage of the plane portion on the front side of the filter body 4b and the dots 4d on the back side thereof by reason of the sliding action on the base plate 2 and the barrier 3 when the protecting case 4c is brought into contact with the base plate 2 and the barrier 3. In this way, it is ensured that there is no adverse affect on the filter.

Furthermore, in the above-described arrangement of the filter, the side having the random dots 4d which can be easily damaged such as to greatly affect the filter performance is directed to the side of the photographic lens 1 so that there is no possibility of the dot side of the filter mistakenly being damaged by a photographer when a photograph is taken, whereby the filter is more effectively protected.

As described above, this invention can improve the filter apparatus for cameras from the various viewpoints and has an extremely high efficiency.

What is claimed is:

1. A filter apparatus for a camera comprising:
   (A) a protecting cover;
   (B) a filter;

(C) first actuating means for placing said protecting cover in a non-operating state;
(D) second actuating means for placing said filter in an operational state;
(E) first holding means for holding said protecting cover in said non-operating state;
(F) second holding means for holding said filter in said operational state; and
(D) release means for automatically releasing the holding of said second holding means without releasing the holding of said first holding means before the next photographic operation.

2. A filter apparatus according to claim 1, wherein said filter includes displacement means for placing said filter in and taking said filter out of an optical path of the camera.

3. A filter apparatus according to claim 2, wherein said second actuating means includes inserting means for inserting said filter into the optical path of the camera.

4. A filter apparatus according to claim 3, wherein said release means includes means for removing said filter from the optical path of the camera.

5. A filter apparatus according to claim 2, further comprising protective means for protecting the surface of said filter from damage to the surface of said filter.

6. A filter apparatus according to claim 1, wherein one side of said filter has a filter functional portion for producing a filter effect, said one side being opposed to the side of a subject to be photographed by the camera.

7. A filter apparatus according to claim 2, wherein said protecting cover is provided for protecting a photographic optical system of the camera, and wherein said filter comprises means for inserting said filter into the optical path of the camera in response to the protecting cover being placed in a state in which said protecting cover is placed in the optical path.

8. A filter apparatus according to claim 1, wherein said protecting cover is provided for protecting a photographic optical system of the camera, further comprising operating means which places said protecting cover in said filter in a non-operational state in response to said operating means being placed in a first state and wherein said operating means places said filter in the operational state while placing said protecting cover in the non-operational state in response to said operating means being placed in a second state.

9. A filter apparatus according to claim 1, wherein said second holding means includes interlocking means for holding said filter in the operational state in response to the setting of a self-timer photographic mode for the camera.

10. A filter apparatus according to claim 1, wherein said releasing means comprises return means for releasing said second holding means so that said holding means does not hold said filter in the operational state against said release means while being interlocked with an element of said release means while being interlocked with an element of the camera for actuating the taking of a photograph.

11. A filter apparatus according to claim 10, wherein said return means includes frame feed interlocking means for interlocking with means for feeding a photosensitive material in the camera.

12. A filter apparatus according to claim 1, wherein said release means includes response means operative in response to a preparation operation for the next photographic operation.

13. A camera comprising:
(A) a housing;
(B) a protecting cover supported by said housing;
(C) a filter supported by said housing;
(D) first actuating means for placing said protecting cover in a non-operating state;
(E) second actuating means for placing said filter in an operational state;
(F) first holding means for holding said protecting cover in said non-operating state; and
(G) second holding means for holding said filter in said operational state; and
(H) release means for automatically releasing the holding of said second holding means without releasing the holding of said first holding means before the next photographic operation.

14. A camera according to claim 13, wherein said filter includes displacement means for placing said filter in and taking said filter out of an optical path of the camera.

15. A camera according to claim 14, wherein said second actuating means includes inserting means for inserting said filter into the optical path of the camera.

16. A camera according to claim 15, wherein said release means includes means for removing said filter from the optical path of the camera.

17. A camera according to claim 14, further comprising protective means for protecting the surface of said filter from damage to the surface of said filter.

18. A camera according to claim 13, wherein one side of said filter has a filter functional portion for producing a filter effect, said one side being opposed to the side of a subject to be photographed by the camera.

19. A camera according to claim 14 further comprising:
a photographic optical system; and
a protective cover for protecting said photographic optical system, wherein said filter includes means for inserting said filter into the optical path of said photographic optical system in response to the protective cover being placed in a state in which said protective cover is placed in the optical path of said photographic optical system.

20. A camera according to claim 13, further comprising:
a photographic optical system; and
a protective cover for protecting said photographic optical system, wherein said operating means places said protective cover and said filter in a non-operational state in response to said operating means being placed in a first state and further comprising operating means which places said filter in the operational state in response to said operating means being placed in a second state.

21. A camera according to claim 13, further comprising:
a photographic optical system, wherein said protecting cover is provided for protecting said photographic optical system; and
preventing means for preventing said protecting cover from being placed in an operational state when said filter is placed in the operational state.

22. A camera according to claim 13, further comprising means for allowing the camera to operate in response to said filter being placed in the operational state.

23. A camera according to claim 13 further comprising:

means for actuating the camera to record an image; and wherein said release means comprises return means for releasing said holding means so that said holding means does not hold said filter in the operational state against said release means while being interlocked with said actuating means.

24. A camera according to claim 23, wherein said return means includes frame feed interlocking means for interlocking with means for feeding each frame of a photosensitive material in the camera.

25. A camera according to claim 13 wherein said release means includes response means operative in response to a preparation operation for the next photographic operation.

26. A filter apparatus for a camera comprising:
(A) a filter including a displacement means for displacing said filter in and taking said filter out of an optical path of said camera;
(B) operating means for placing said filter in an operational state, said operating means being manually operable by a user to place said filter in its operational state; and
(C) release means for automatically releasing said filter from the operational state in response to the disengagement of the user from said operating means; and
(D) a protective cover for protecting a photographic optical system of the camera, wherein said filter enters the optical path of the camera in response to the protective cover being placed in a state in which said protective cover is placed in the optical path.

27. A filter apparatus according to claim 26, wherein said operating means includes inserting means for inserting said filter into the optical path of the camera.

28. A filter apparatus according to claim 27, wherein said release means includes urging means for removing said filter from the optical path of the camera.

29. A filter apparatus according to claim 26, further comprising protective means for protecting the surface of said filter from damage to the surface of said filter.

30. A filter apparatus for a camera comprising:
(A) a filter;
(B) operating means for placing said filter in an operational state, said operating means being manually operable by a user to place said filter in its operational state;
(C) release means for automatically releasing said filter from the operational state in response to the disengagement of the user from said operating means; and
(D) a protective cover for protecting a photographic optical system of the camera, wherein said operating means places said protective cover and said filter in a non-operational state in response to said operating means being placed in a first state and wherein said operating means places said filter in the operational state while placing said protective cover in the non-operational state in response to said operating means being placed in a second state.

31. A filter apparatus for a camera comprising:
(A) a filter;
(B) operating means for placing said filter in an operational state, said operating means being manually operable by a user to place said filter in its operational state;
(C) release means for automatically releasing said filter from the operational state in response to the disengagement of the user from said operating means;
(D) a protective cover for protecting a photographic optical system of the cameras; and
(E) preventing means for preventing said protective cover from being placed in an operational state when said filter is placed in the operational state.

32. A filter apparatus according to any one of claims 26, 30, and 31.

33. A filter apparatus for a camera comprising:
(A) a filter;
(B) operating means for placing said filter in an operational state, said operating means being manually operable by a user to place said filter in its operational state;
(C) release means for automatically releasing said filter from the operational state in response to the disengagement of the user from said operating means;
(D) holding means for holding said filter in the operational state against said release means; and
(E) said holding means includes interlocking means for holding said filter in the operational state in response to the setting of a self-timer photographic mode for the camera.

34. A filter apparatus for a camera comprising:
(A) a filter;
(B) operating means for placing said filter in an operational state, said operating means being manually operable by a user to place said filter in its operational state;
(C) release means for automatically releasing said filter from the operational state in response to the disengagement of the user from said operating means;
(D) holding means for holding said filter in the operational state against said release means; and
(E) return means for releasing said holding means so that said holding means does not hold said filter in the operational state against said release means while being interlocked with an element of the camera for actuating the taking of a photograph.

35. A filter apparatus according to claim 34, wherein said return means includes frame feed interlocking means for interlocking with means for feeding each frame of a image recording medium in the camera.

36. A filter apparatus according to any one of claims 26, 30, 31, 33, and 34, wherein one side of said filter has a filter functional portion for producing a filter effect, said one side being opposed to the side of a subject to be photographed by the camera.

37. A filter apparatus according to any one of claims 26, 30, 31, 33, and 34 further comprising means for allowing the camera to operate in response to said filter being placed in the operational state, wherein said allowing means comprises a switch.

38. A camera comprising:
(A) a housing;
(B) a filter supported by said housing;
(C) operating means, supported by said housing, for placing said filter in an operational state, said operating means being manually operable by a user to place said filter in its operable state; and
(D) release means, supported by said housing, for automatically releasing said filter from the operational state in response to the disengagement of the user from said operating means;

(E) said filter including displacement means for placing said filter in and taking said filter out of an optical path of the camera;

(F) a photographic optical system; and (G) a protective cover for protecting said photographic optical system, wherein said filter enters the optical path of said photographic optical system in response to the protective cover being placed in a state in which said protective cover is placed in the optical path of said photographic optical system.

39. A camera according to claim 38, wherein said operating means includes inserting means for inserting said filter into the optical path of the camera.

40. A camera according to claim 38, wherein said release means includes means for removing said filter from the optical path of the camera.

41. A camera according to claim 38, further comprising protective means for protecting the surface of said filter from damage to the surface of said filter.

42. A camera comprising:

(A) a housing;

(B) a filter supported by said housing;

(C) operating means, supported by said housing, for placing said filter in an operational state, said operating means being manually operable by a user to place said filter in its operational state; and (D) release means, supported by said housing, for automatically releasing said filter from the operational state in response to the disengagement of the user from said operating means;

(E) a photographic optical system; and (F) a protective cover for protecting said photographic optical system, wherein said operating means places said protective cover and said filter in a non-operational state in response to said operating means being placed in a first state and wherein said operating means places said filter in the operational state while placing said protective cover in the non-operational state in response to said operating means being placed in a second state.

43. A camera comprising:

(A) a housing;

(B) a filter supported by said housing;

(C) operating means, supported by said housing, for placing said filter in an operational state, said operating means being manually operable by a user to place said filter in its operational state;

(D) release means, supported by said housing, for automatically releasing said filter from the operational state in response to the disengagement of the user from said operating means;

(E) a photographic optical system;

(F) a protective cover for protecting said photographic optical system; and (G) preventing means for preventing said protective cover from being placed in an operational state when said filter is placed in the operational state.

44. A camera according to any one of claims 38, 42, and 43, further comprising holding means for holding said filter in the operational state against said release means.

45. A camera according to claim 44, wherein said camera is adapted to operate in a self-timer photographic mode, wherein said holding means includes interlocking means for holding said filter in the operational state in response to the setting of a self-timer photographic mode for the camera.

46. A camera comprising:

(A) a housing;

(B) a filter supported by said housing;

(C) operating means, supported by said housing, for placing said filter in an operational state, said operating means being manually operable by a user to place said filter in its operational state;

(D) release means, supported by said housing, for automatically releasing said filter from the operational state in response to the disengagement of the user from said operating means;

(E) holding means for holding said filter in the operational state against said release means; and (F) said camera being adapted to operate in a self-timer photographic mode, wherein said holding means includes interlocking means for holding said filter in the operational state in response to the setting of a self-timer photographic mode for the camera.

47. A camera comprising:

(A) a housing;

(B) a filter supported by said housing;

(C) operating means, supported by said housing, for placing said filter in an operational state, said operating means being manually operable by a user to place said filter in its operational state;

(D) release means, supported by said housing, for automatically releasing said filter from the operational state in response to the disengagement of the user from said operating means;

(E) holding means for holding said filter in the operational state against said release means;

(F) means for actuating the camera to record an image; and (G) return means for releasing said holding means so that said holding means does not hold said filter in the operational state against said release means while being interlocked with said actuating means.

48. A camera according to claim 47, wherein said return means includes frame feed interlocking means for interlocking with means for feeding each frame of a image recording medium in the camera.

49. A camera according to any one of claims 38, 42, 43, 46, and 47, wherein one side of said filter has a filter functional portion for producing a filter effect, said one side being opposed to the said of a subject to be photographed by the camera.

50. A camera according to any one of claims 38, 42, 43, 46, and 47, further comprising means for allowing the camera to operate in response to said filter being placed in the operational state.

* * * * *

UNITED STATES PATENT AND TRADEMARK OFFICE
CERTIFICATE OF CORRECTION

PATENT NO. : 5,079,576

DATED : January 7, 1992

INVENTOR(S) : Takanori Kodaira

It is certified that error appears in the above-identified patent and that said Letters Patent is hereby corrected as shown below:

COLUMN 1:

Line 12, following "4,681,418", add --)--;

Line 29, change "possibly" to --possibility; and

Line 48, change "and" to --to--.

COLUMN 2:

Line 11, change "taken" to --taking--;

COLUMN 4:

Line 15, change "cams 6a" to --cams 6b--.

COLUMN 5:

Line 2, change "ever 13" to --lever 13--;

COLUMN 8:

Line 10, delete "and".

COLUMN 9:

Line 2, delete "and";

Line 12, following "claim 13", add --,--; and

Line 23, delete "and".

UNITED STATES PATENT AND TRADEMARK OFFICE
CERTIFICATE OF CORRECTION

PATENT NO. : 5,079,576
DATED : January 7, 1992
INVENTOR(S) : Takanori KODAIRA

It is certified that error appears in the above-identified patent and that said Letters Patent is hereby corrected as shown below:

COLUMN 10:
    Line 6, change "cameras" to --camera--;
    Line 11, change "and 31." to --and 31, further comprising holding means for holding said filter in the operational state against said release means.--; and
    Line 49, following "frame of" delete --a--.

COLUMN 11:
    Line 30, delete "and".

COLUMN 12:
    Line 51, change "a" to --an--; and
    Line 56, change "said" to --side--.

Signed and Sealed this

Fifteenth Day of June, 1993

Attest:

MICHAEL K. KIRK

*Attesting Officer*      *Acting Commissioner of Patents and Trademarks*